United States Patent [19]

Roach et al.

[11] Patent Number: 5,263,730
[45] Date of Patent: Nov. 23, 1993

[54] JOGGING STROLLER

[76] Inventors: Douglas R. Roach; Louise A. Roach, both of 6890 Parkridge Ct., Colorado Springs, Colo. 80915

[21] Appl. No.: 17,180

[22] Filed: Feb. 12, 1993

[51] Int. Cl.⁵ .................................................. B62B 9/10
[52] U.S. Cl. .................................. 280/47.4; 280/62; 297/243; D12/129; D34/18
[58] Field of Search ............ 280/62, 47.38, 47.4, 280/647, 650, 658; 297/243, 445; D12/129; D34/18

[56]  References Cited

U.S. PATENT DOCUMENTS

| | | | |
|---|---|---|---|
| D. 162,495 | 3/1951 | Trimble | D12/129 |
| D. 296,540 | 7/1988 | Perego | D12/129 |
| D. 297,525 | 9/1988 | Baechler | D12/129 |
| D. 315,885 | 4/1991 | Jacobs | D12/129 |
| D. 321,850 | 11/1991 | Mong-Hsing | 280/47.38 X |
| D. 332,591 | 1/1993 | Reely | 280/47.38 X |
| 699,186 | 5/1902 | Katzke | 280/658 |
| 3,612,603 | 10/1971 | Snyder et al. | 280/647 X |
| 4,725,071 | 2/1988 | Shamie | 280/47.4 X |
| 4,728,112 | 3/1988 | Wynens | 280/474 |
| 4,858,947 | 8/1989 | Yee et al. | 280/47.4 X |
| 4,902,027 | 2/1990 | Skelly | 280/62 X |
| 4,953,880 | 9/1990 | Sudakoff et al. | 280/62 X |
| 5,029,891 | 7/1991 | Jacobs | 280/62 X |
| 5,033,761 | 7/1991 | Kelly | 297/243 X |
| 5,176,395 | 1/1993 | Garforth-Bles | 280/62 X |

Primary Examiner—Brian Johnson
Attorney, Agent, or Firm—Leon Gilden

[57]  ABSTRACT

A stroller arrangement includes an elongate planar platform, having first and second seat members arranged in an aligned relationship relative to one another, with a first seat positioned forwardly of a rearward most seat mounted to the platform structure. The arrangement is directed to include a surrounding framework relative to the seat structure, having a rearwardly projecting handle, with rear wheels of a first diameter at a rear distal end of the platform, with a forward pivotally mounted wheel at a forwardmost end of the platform and frame assembly for pivotal mounting relative to the framework, with the forward wheel of a second diameter less than a first diameter of the rear wheels permitting ease of maneuverability of the organization in use.

5 Claims, 4 Drawing Sheets

JOGGING STROLLER

BACKGROUND OF THE INVENTION

1. Field of the Invention

The field of invention relates to stroller apparatus, and more particularly pertains to a new and improved jogging stroller apparatus wherein the same permits an individual ease of maneuvering during walking and jogging relative to the stroller structure.

2. Description of the Prior Art

Strollers of various types have been utilized throughout the prior art to accommodate infants and the like and such apparatus is exemplified in U.S. Pat. Nos. 4,725,071 and 4,953,880, wherein the patent directed to a jogging stroller includes a tri-wheeled structure. Further examples of stroller apparatus is exemplified in the U.S. Pat. Nos. 3,612,603; 4,728,112; and U.S. Pat. No. Des. 296,540.

The instant invention attempts to overcome deficiencies of the prior art by providing for a rigid stroller employing a forward and rear seat arranged in a longitudinally aligned relationship, with a rearwardly projecting handle permitting ease of maneuverability of the organization in use and in this respect, the present invention substantially fulfills this need.

SUMMARY OF THE INVENTION

In view of the foregoing disadvantages inherent in the known types of stroller apparatus now present in the prior art, the present invention provides a jogging stroller apparatus wherein the same is arranged as a plurality of seats in a longitudinally aligned relationship relative to an underlying platform. As such, the general purpose of the present invention, which will be described subsequently in greater detail, is to provide a new and improved jogging stroller apparatus which has all the advantages of the prior art stroller apparatus and none of the disadvantages.

To attain this, the present invention provides a stroller arrangement including an elongate planar platform, having first and second seat members arranged in an aligned relationship relative to one another, with a first seat positioned forwardly of a rearwardmost seat mounted to the platform structure. The arrangement is directed to include a surrounding framework relative to the seat structure, having a rearwardly projecting handle, with rear wheels of a first diameter at a rear distal end of the platform, with a forward pivotally mounted wheel at a forwardmost end of the platform and frame assembly for pivotal mounting relative to the framework, with the forward wheel of a second diameter less than a first diameter of the rear wheels permitting ease of maneuverability of the organization in use.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved jogging stroller apparatus which has all the advantages of the prior art stroller apparatus and none of the disadvantages.

It is another object of the present invention to provide a new and improved jogging stroller apparatus which may be easily and efficiently manufactured and marketed.

It is a further object of the present invention to provide a new and improved jogging stroller apparatus which is of a durable and reliable construction.

An even further object of the present invention is to provide a new and improved jogging stroller apparatus which is susceptible of a low cost of manufacture with regard to both materials and labor, and which accordingly is then susceptible of low prices of sale to the consuming public, thereby making such jogging stroller apparatus economically available to the buying public.

Still yet another object of the present invention is to provide a new and improved jogging stroller apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
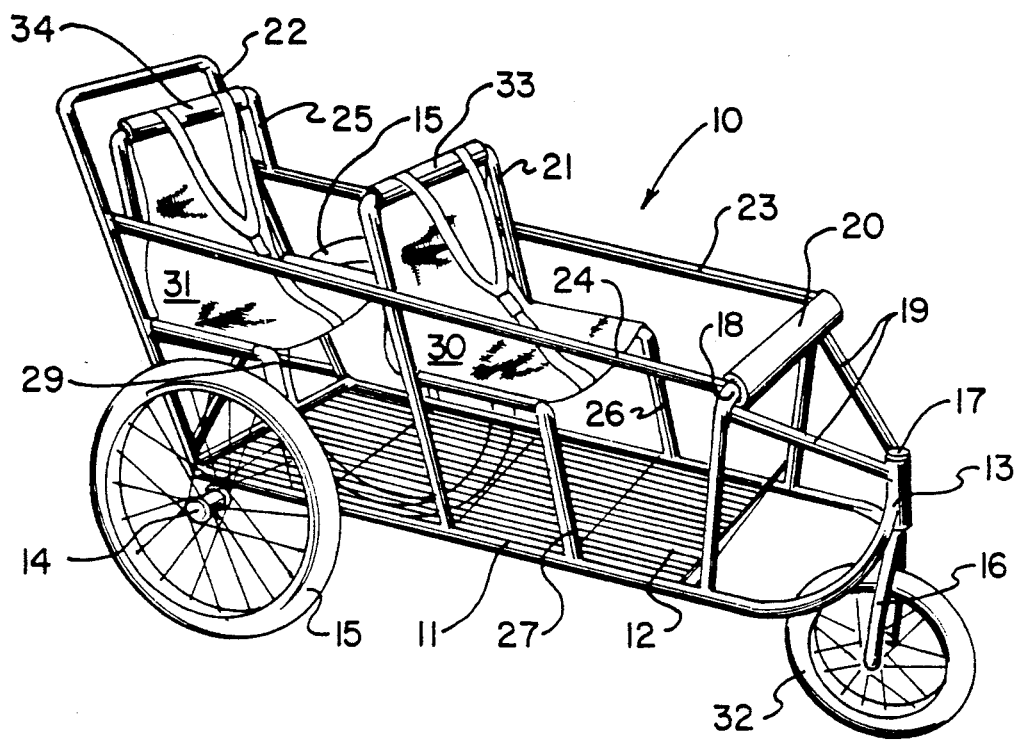
FIG. 1 is an isometric illustration of the invention.
Figure 2:
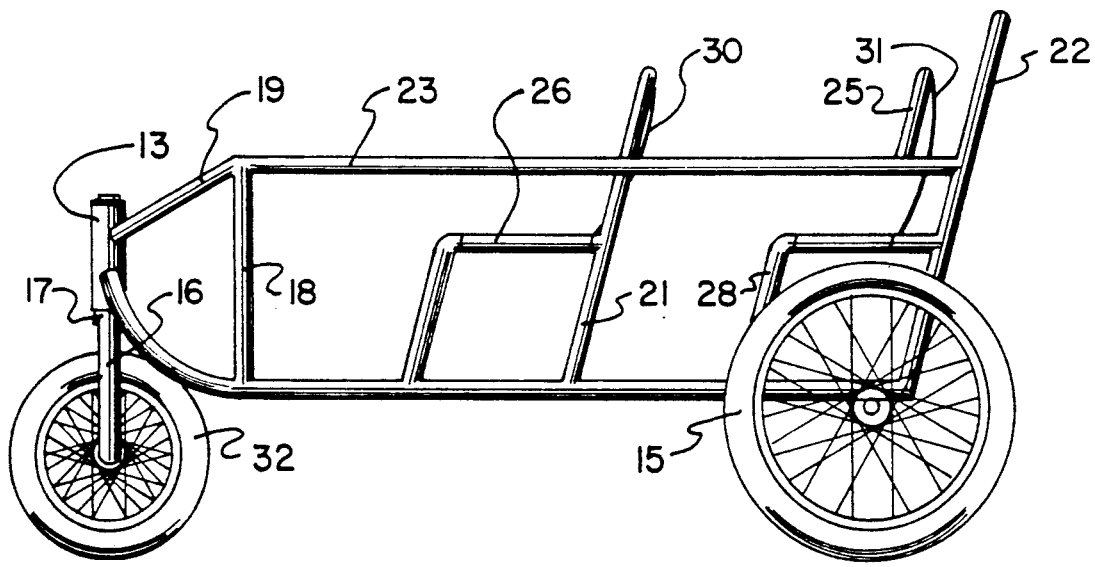
FIG. 2 is an orthographic side view of the stroller apparatus.
Figure 3:
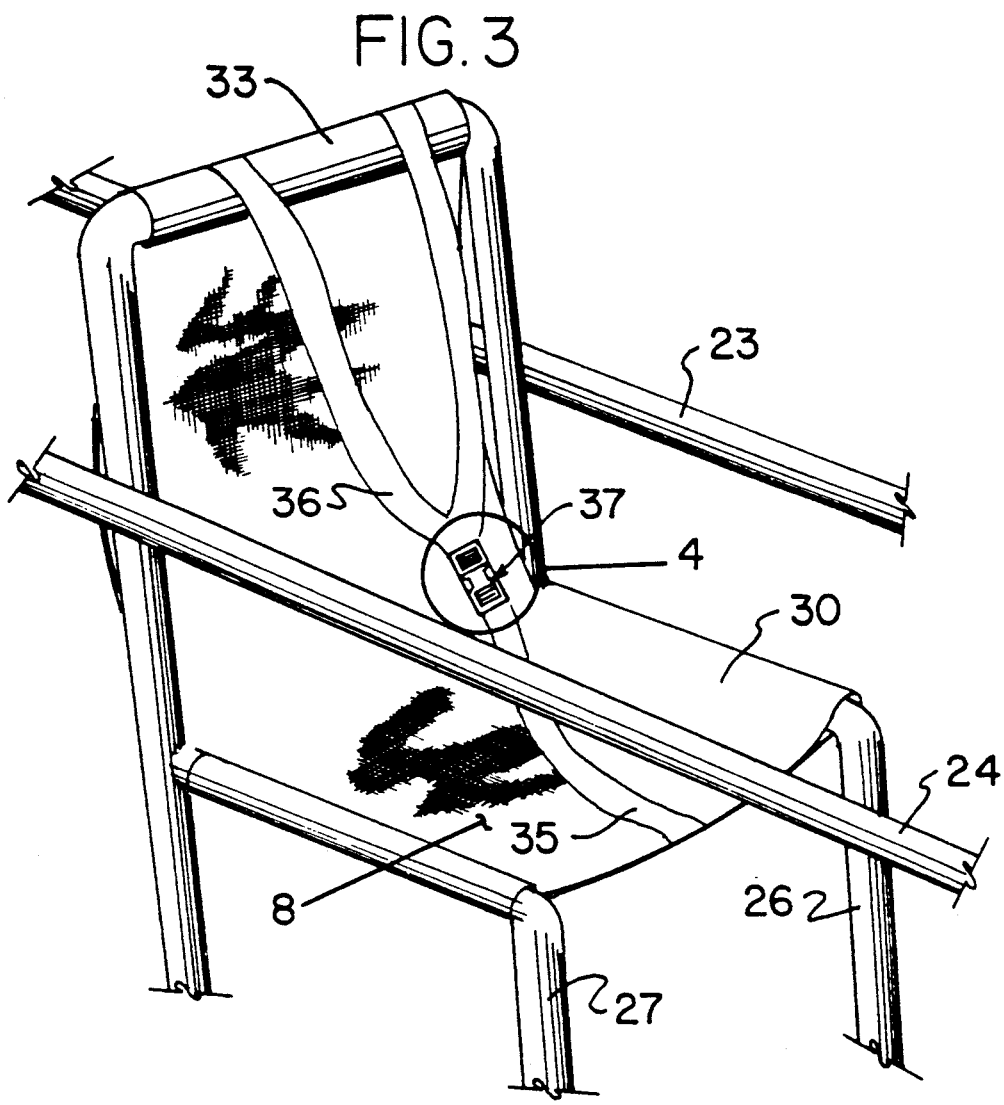
FIG. 3 is an isometric enlarged view of the forward seat assembly.
Figure 4:
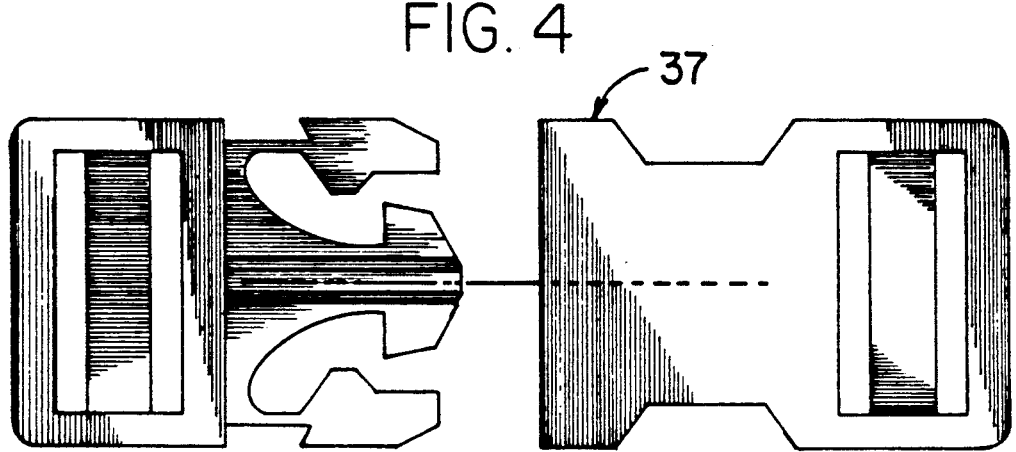
FIG. 4 is an enlarged orthographic view of the seat buckle structure as set forth in section 4 of FIG. 3.

With reference now to the drawings, and in particular to FIGS. 1 to 8 thereof, a new and improved jogging stroller apparatus embodying the principles and concepts of the present invention and generally designated by the reference numeral 10 will be described.

More specifically, the jogging stroller apparatus 10 of the instant invention essentially comprises a continuous base frame rail 11 mounting a planar platform 12 therewithin. The platform 12 extends from a rear distal end of the frame rail 11 to a spaced relationship relative to a neck tube 13 integrally mounted to a forward distal end of the frame rail 11. The neck tube is oriented at an oblique angulation relative to the platform 12. A rear axle 14 is mounted adjacent the rear distal end of the frame rail 11 mounting rear wheels 15 on opposed ends of the rear axle exteriorly of the platform 12, with the rear wheels 15 of a first diameter. A bifurcated front wheel support 16 rotatably mounts a front wheel 32 of a second diameter less than the first diameter thereto, with the bifurcated front wheel supports 16 having a front wheel support tube 17 rotatably mounted within the neck tube 13. A first U-shaped frame 18 is mounted to the base frame rail 11 in adjacency to the neck tube 13, with a plurality of first frame legs 19 extending from the first U-shaped frame 18 to the neck tube 13 to afford stability to the neck tube in use. A first frame cushion 20 is mounted about the first U-shaped frame 18 above and parallel to the platform 12. A second U-shaped frame 21 is mounted to the base frame rail 11 in a spaced relationship, with a third U-shaped frame 22 mounted to the base frame rail 11, with the second U-shaped frame 21 mounted intermediate the first U-shaped frame and the third U-shaped frame 22. The third U-shaped frame 22 terminates in a projecting handle member rearwardly of the axle 14. A back rest rail 25 adjacent the third U-shaped frame 22 is mounted to respective first and second side rails 23 and 24 that are directed from the third U-shaped rail to the second U-shaped rail and joined to the first U-shaped rail 18. The side rails provide for geometric integrity and afford protection to occupants within the organization. The back rest rail 25 mounts a third cushion 34, with a second cushion 33 mounted to an uppermost connecting web of the second U-shaped frame 21.

A forward first and second plurality of L-shaped seat rails 26 and 27 extend from the second U-shaped rail 21 at first ends of the first and second respective L-shaped seat rails 26 and 27, with second ends of the first and second seat rails 26 and 27 fixedly mounted to opposed sides of the continuous base frame rail 11. Similarly, rear first and second L-shaped seat rails 28 and 29 are integrally secured at their first ends to the third U-shaped rail (22) and second ends of the first and second L-shaped seat rails 28 and 29 fixedly mounted to the base rail 11, with the L-shaped seat rails 26–29 oriented between the side rails 23 and 24 and the base rail 11, as illustrated, to position an individual's torso in a position or relative protection within the structure. First and second L-shaped seat webs 30 and 31 are provided, employing seat web snap fasteners 45 (see FIG. 8) to secure the respective L-shaped seat webs 30 and 31 to the respective forward and rear L-shaped seat rails 26, 27, and 28, 29. The first L-shaped seat web 30 is mounted to the first U-shaped rail, while the second seat web 31 extends to permit securement to the back rest rail 25 in a spaced relationship relative to the handle portion of the third U-shaped rail 22 affording protection to the occupant positioned upon the second L-shaped seat web 31. Each L-shaped web 30 includes a first seat belt web 35 arranged for securement to a second Y-shaped web 36, wherein the Y-shaped web 36 of the first L-shaped web 30 is mounted relative to the second U-shaped frame 21, while the second Y-shaped web 36 of the second seat web 31 is mounted to the back rest rail 25, as illustrated. Each of the webs include cooperative buckle assemblies 37 permitting securement of the occupant relative to the seats, as illustrated.

Figure 5:
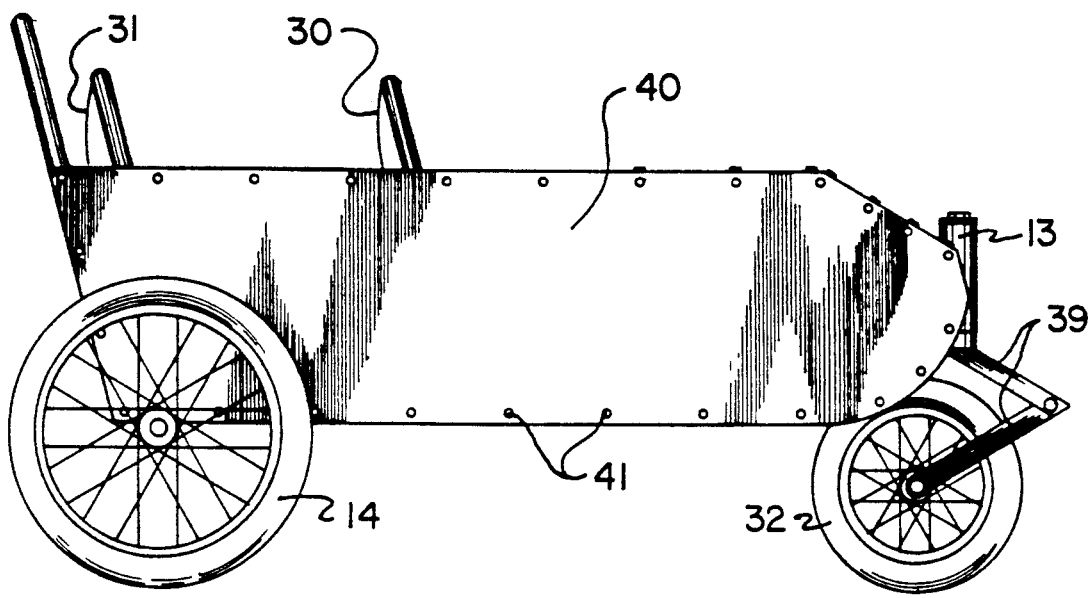
FIG. 5 is an orthographic side view of the invention employing side panels.
Figure 6:
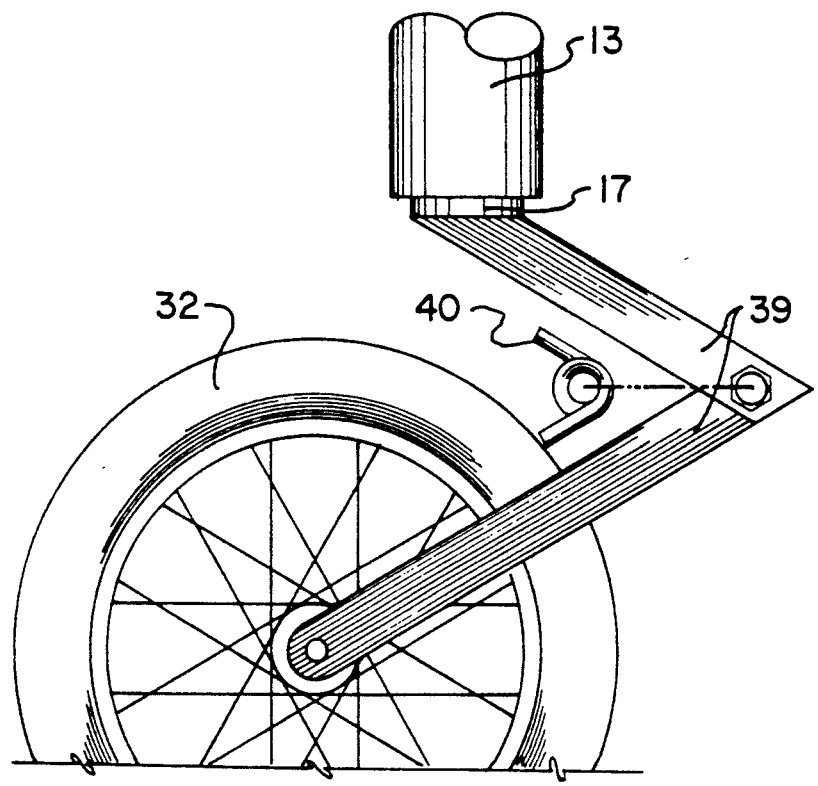
FIG. 6 is an enlarged orthographic side view of a forward wheel mount employing a shock absorbing spring structure.

The FIGS. 5 and 6 illustrate the bifurcated front support 16 having pivoted link pairs 39 mounted to opposed sides of the front wheel 32, with each pair of pivoted links 39 employing a spring member 40 to bias the respective pairs of pivoted links in a spaced relationship to afforded cushioning relative to use of the organization.

Figure 7:
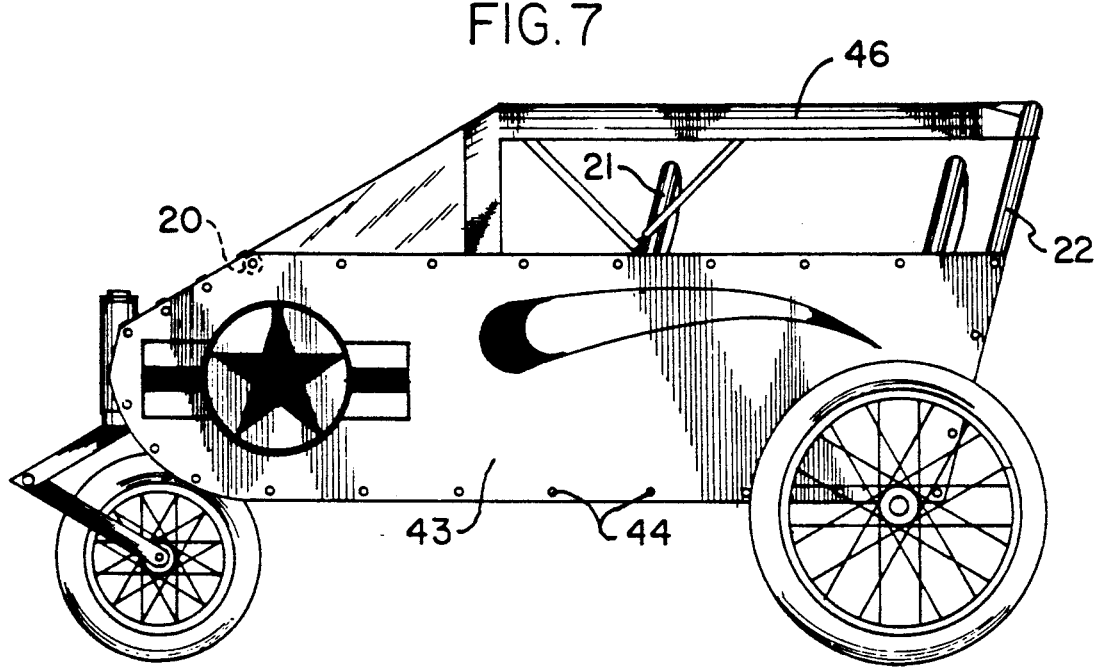
FIG. 7 is an orthographic left side view of the invention employing a hood covering.
Figure 8:
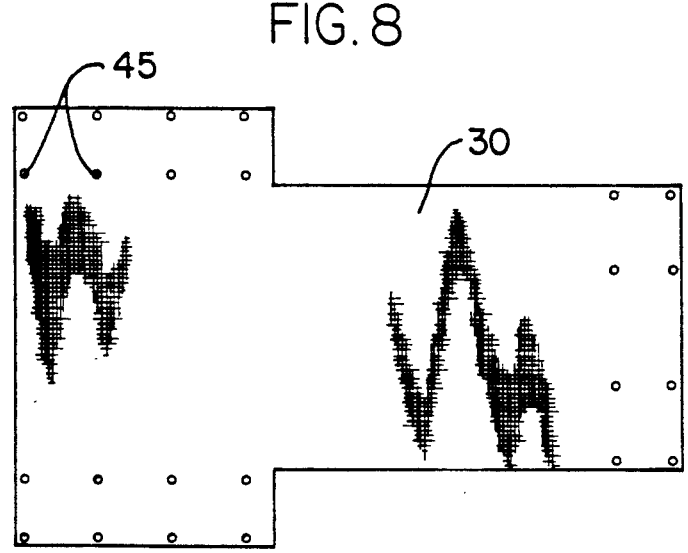
FIG. 8 is an orthographic top view of a seat covering web of the invention.

The FIGS. 5 and 7 illustrate the use of respective first and second side panels 41 and 43, employing respective first and second snap fasteners 42 and 44 securing the side panels 41 from the base rail 11 to the first and second side rails 23 and 24 respectively relative to the first and second side panels 41 and 43. Further, a hood assembly 46 if desired to afford protection during inclement weather such as rain and the like is arranged to extend from the handle portion of the third U-shaped frame 22 to the first U-shaped frame 18 about the frame cushion 20.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A jogging stroller apparatus, comprising,
   a continuous base frame rail, the base frame rail having a rear distal end spaced from a forward distal end, and
   a planar platform fixedly mounted within the base frame while extending from the rear distal end and in a spaced relationship from to the forward distal end, and the forward distal end including a neck tube connected therewith and oriented at an oblique angulation relative to the planar platform, and
- a rear axle mounted to the base frame rail in adjacency to the rear distal end, with the rear axle including a plurality of rear wheels mounted to the rear axle, with the rear wheels oriented exteriorly of the base frame rail, and each of the rear wheels are of a first diameter, and
- a bifurcated front wheel support having a support tube, with the support tube rotatably directed through the neck tube, with a front wheel mounted to the bifurcated front wheel support, with the front wheel of a second diameter less than the first diameter, and
- a first U-shaped frame mounted to the base frame rail in adjacency to the forward distal end, and a second U-shaped frame mounted to the base frame rail spaced from the first U-shaped frame, and a third U-shaped frame mounted to the base frame rail oriented between the rear distal end and the second frame rail, with the second U-shaped frame oriented between the third U-shaped frame and the first U-shaped frame, and
- a first side rail and a second side rail arranged in a parallel spaced relationship mounted to the first U-shaped frame, the second U-shaped frame, and the third U-shaped frame, with a first seat assembly mounted to the second U-shaped frame and a second seat assembly mounted adjacent to the third U-shaped frame on the first and second side rails, wherein the third U-shaped frame extends rearwardly of the second seat assembly projecting beyond the rear axle terminating in a handle member.

2. An apparatus as set forth in claim 1 with a forward first L-shaped seat rail extending from the second U-shaped frame to the base frame rail positioned between the second side rail and the base frame rail, and a forward second L-shaped seat rail extending from the second U-shaped frame to the base frame rail and oriented between the first side rail and the base frame rail, and the first seat assembly including the forward first L-shaped seat rail and the forward second L-shaped seat rail, including a first L-shaped seat web, and the second seat assembly including a back rest rail of U-shaped configuration oriented between the third U-shaped frame and the second U-shaped frame, with the back rest rail mounted to the first side rail and the second side rail, and the second seat assembly including a rear first L-shaped seat rail mounted to the third U-shaped frame and to the base frame rail oriented between the second side rail and the base frame rail, and a rear second L-shaped seat rail extending from the third U-shaped frame to the base frame rail and oriented between the first side rail and the base frame rail, and the second seat assembly including a second L-shaped seat web mounted to the rear first L-shaped seat rail, the rear second L-shaped seat rail, and the back rest rail.

3. An apparatus as set forth in claim 2 wherein the first seat web and the second seat web each include a first seat belt web, and the first seat web and the second seat web further each include a second Y-shaped belt web for securement to a respective one of said first seat belt webs.

4. An apparatus as set forth in claim 3 wherein the bifurcated front wheel support has mounted thereto a plurality of pivoted link pairs, with each pivoted link pair of said pivoted link pairs having a spring member to bias each of said pivot link pairs in a spaced relationship and accommodate impact to the front wheel support.

5. An apparatus as set forth in claim 4 including a first side panel securable to the first side rail coextensively of the first side rail and mounted to the base frame rail, with a second side panel mounted coextensively to the second side rail and secured to the second side rail and the base frame rail, and a hood assembly secured to and extending from the handle to the first U-shaped frame.

* * * * *